| (12) | United States Patent | (10) Patent No.: | US 7,552,658 B2 |
|---|---|---|---|
| | Forsyth | (45) Date of Patent: | Jun. 30, 2009 |

(54) THREE CLUTCH POWERSHIFT TRANSMISSION

(75) Inventor: John R. Forsyth, Romeo, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 364 days.

(21) Appl. No.: 11/626,420

(22) Filed: Jan. 24, 2007

(65) Prior Publication Data

US 2007/0214903 A1 Sep. 20, 2007

Related U.S. Application Data

(60) Provisional application No. 60/783,192, filed on Mar. 16, 2006.

(51) Int. Cl.
*F16H 3/08* (2006.01)

(52) U.S. Cl. .......................................... 74/329; 74/330

(58) Field of Classification Search ................... 74/329, 74/330, 333
See application file for complete search history.

(56) References Cited

U.S. PATENT DOCUMENTS

| 3,991,634 A | * | 11/1976 | Longshore | .................... | 74/745 |
|---|---|---|---|---|---|
| 4,132,133 A | * | 1/1979 | Ballendux | .................... | 74/745 |
| 4,823,628 A | * | 4/1989 | Hiraiwa | .................... | 74/330 |
| 5,890,392 A | | 4/1999 | Ludanek et al. | | |
| 5,966,989 A | | 10/1999 | Reed, Jr. et al. | | |
| 6,427,549 B1 | | 8/2002 | Bowen | | |
| 6,428,438 B1 | | 8/2002 | Bowen | | |
| 6,460,425 B1 | | 10/2002 | Bowen | | |
| 6,499,370 B2 | | 12/2002 | Bowen | | |
| 6,575,866 B2 | | 6/2003 | Bowen | | |
| 6,860,168 B1 | | 3/2005 | Kobayashi | | |
| 6,881,169 B2 | | 4/2005 | Katakura | | |
| 6,907,801 B2 | | 6/2005 | Shimaguchi | | |
| 6,958,028 B2 | | 10/2005 | Janson et al. | | |
| 6,966,860 B2 | | 11/2005 | Heitmann et al. | | |
| 6,969,335 B2 | | 11/2005 | Lorken | | |
| 7,044,014 B2 | | 5/2006 | Janson et al. | | |
| 7,070,534 B2 | | 7/2006 | Pelouch | | |
| 7,073,407 B2 | | 7/2006 | Stefina | | |
| 7,077,025 B2 | | 7/2006 | Janson et al. | | |
| 7,082,850 B2 | | 8/2006 | Hughes | | |
| 7,083,540 B2 | | 8/2006 | Janson et al. | | |

(Continued)

FOREIGN PATENT DOCUMENTS

KR 2005042671 A * 5/2005

*Primary Examiner*—Ha D. Ho
(74) *Attorney, Agent, or Firm*—Harness, Dickey & Pierce, P.L.C.

(57) ABSTRACT

An automated triple-clutch multi-speed transmission is adapted to transfer power from the engine to the driveline of a motor vehicle. The transmission includes a first clutch operable for establishing a releasable drive connection between an input shaft and a first shaft, a second clutch operable for establishing a releasable drive connection between the input shaft and a second shaft and a third clutch operable for establishing a releasable drive connection between the input shaft and a third shaft. A first constant mesh gearset is driven by the first shaft. A second constant mesh gearset is driven by the second shaft. A third constant mesh gearset is driven by the third shaft. First, second and third gearset clutches are operable for releasably drivingly coupling the first, second and third gearsets to a countershaft which, in turn, drives an output shaft.

22 Claims, 3 Drawing Sheets

U.S. PATENT DOCUMENTS

| | | |
|---|---|---|
| 7,114,409 B2 | 10/2006 | Eggert et al. |
| 7,155,993 B2 | 1/2007 | Koenig et al. |
| 7,243,565 B2 * | 7/2007 | Soeda ......................... 74/329 |
| 7,258,032 B2 * | 8/2007 | Kim ............................ 74/330 |
| 2005/0101426 A1 * | 5/2005 | Sugino et al. ............... 475/207 |

* cited by examiner

THREE CLUTCH POWERSHIFT TRANSMISSION

CROSS REFERENCE

This application claims the benefit of U.S. Provisional Application Ser. No. 60/783,192 filed Mar. 16, 2006, the entire disclosure of which is incorporated by reference

FIELD

The present disclosure relates to transmissions for use in motor vehicles and, more particularly, to a triple-clutch automated transmission applicable for use in motor vehicles.

BACKGROUND

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to the smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

SUMMARY

Accordingly, the present invention provides a triple-clutch transmission and a control system for permitting automatic shifting of the triple-clutch transmission.

The automated triple-clutch multi-speed transmission of the present invention is adapted to transfer power from the engine to the driveline of a motor vehicle. The transmission includes an output shaft adapted for connection to the driveline, an input shaft continuously driven by the engine, a countershaft in constant driving engagement with the output shaft, first, second and third clutches, first, second and third constant mesh gearsets and first, second and third gearset clutches. The first clutch is operable for establishing a releasable drive connection between the input shaft and a first shaft. The second clutch is operable for establishing a releasable drive connection between the input shaft and a second shaft. The third clutch is operable for establishing a releasable drive connection between the input shaft and a third shaft. The first constant mesh gearset is driven by the first shaft. The second constant mesh gearset is driven by the second shaft. The third constant mesh gearset is driven by the third shaft. The first gearset clutch is operable for releasably drivingly coupling the first gearset and the countershaft. The second gearset clutch is operable for releasably drivingly coupling the second gearset and the countershaft. The third gearset clutch is operable for releasably drivingly coupling the third gearset and the countershaft.

The automated triple-clutch transmission of the present invention further includes fourth, fifth and sixth constant mesh gearsets. The fourth constant mesh gearset is driven by the first shaft and the first gearset clutch is operable for releaseably drivingly coupling the fourth gearset and the countershaft. The fifth constant mesh gearset is driven by the second shaft and the second gearset clutch is operable for releaseably drivingly coupling the fifth gearset and the countershaft. Finally, the sixth constant mesh gearset is driven by the third shaft and the third gearset clutch is operable for releaseably drivingly coupling the sixth gearset and the countershaft. Accordingly, a six-speed powershiftable transmission is provided.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
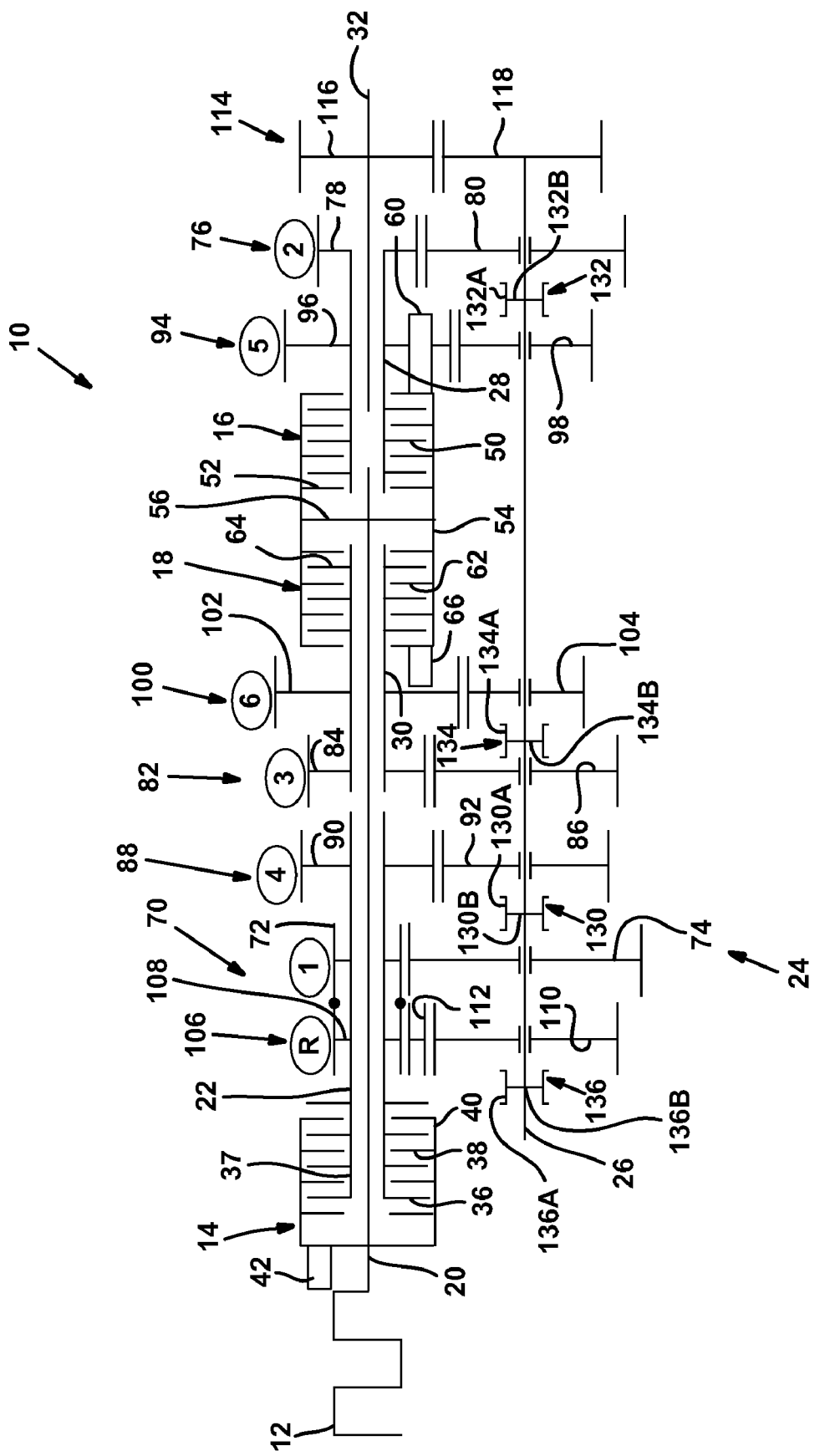
FIG. 1 is a schematic view of a triple-clutch automated transmission as described in the disclosure.

The following description is merely exemplary in nature and is not intended to limit the present disclosure, application, or uses. It should be understood that throughout the drawings, corresponding reference numerals indicate like or corresponding parts and features.

Figure 2:
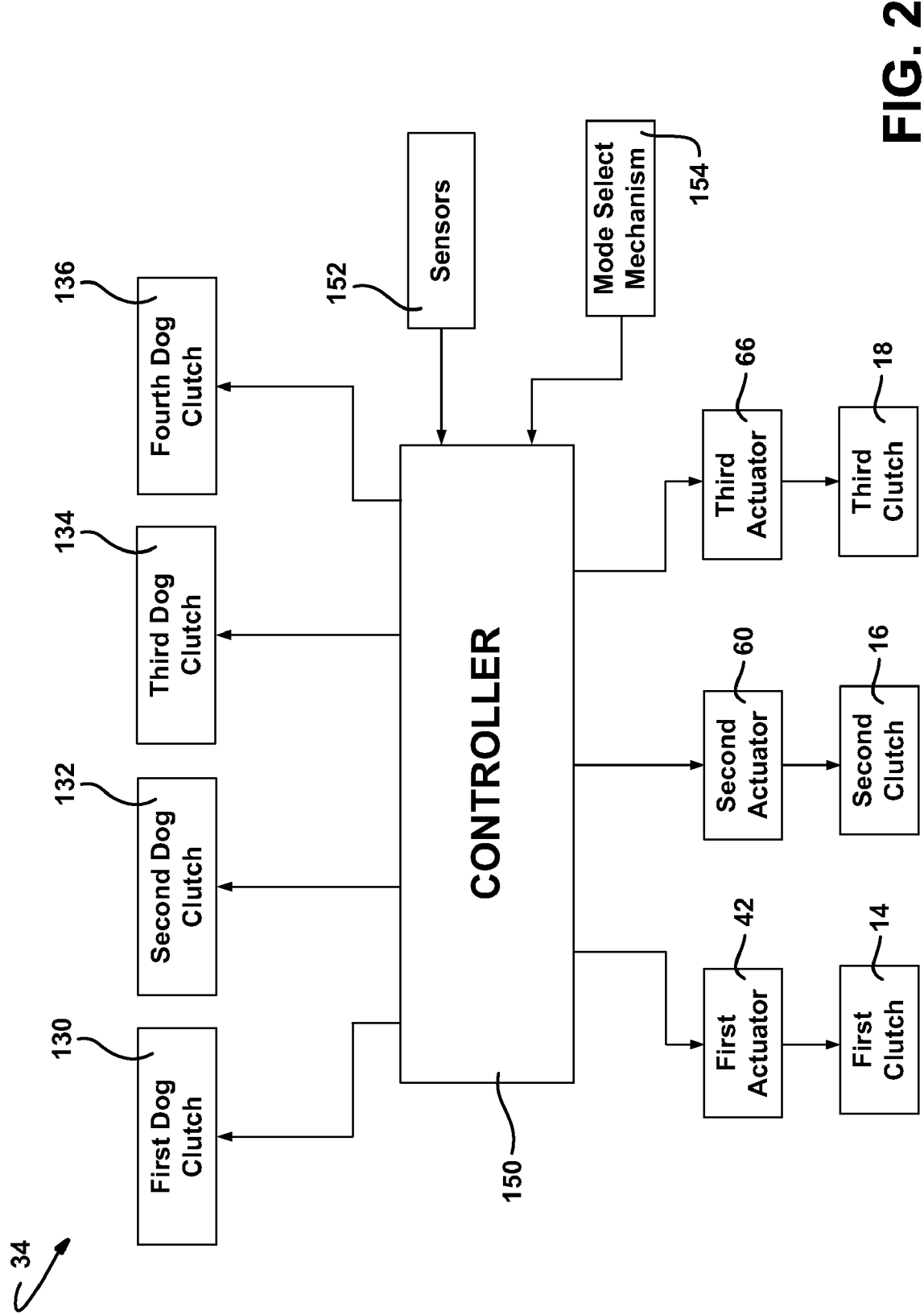
FIG. 2 is a diagrammatic illustration of a transmission control system adapted for use with the triple-clutch automated transmission shown in FIG. 1.
Figure 3:
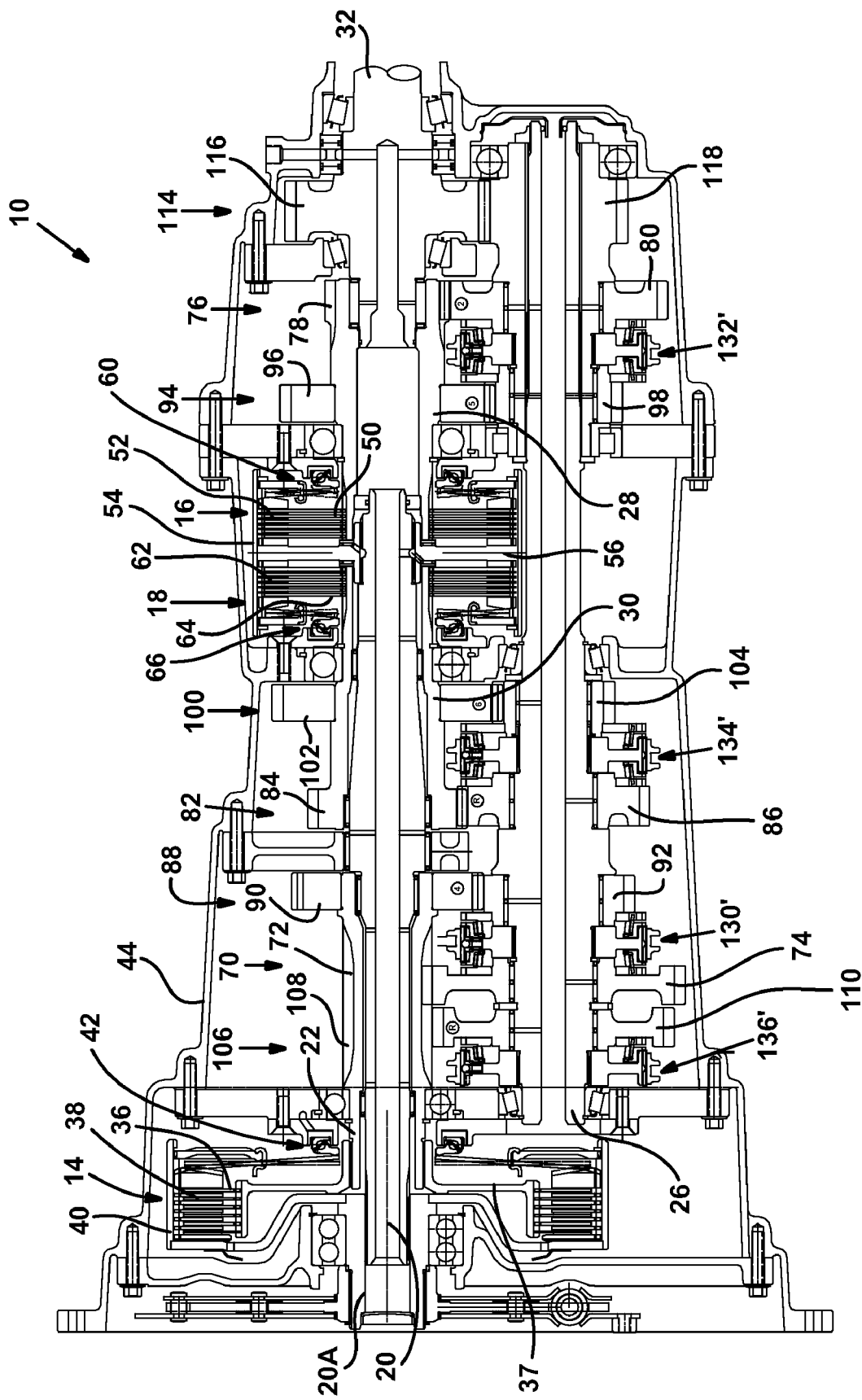
FIG. 3 is a cross-sectional view of the triple-clutch automated transmission.

With reference to FIGS. 1-3 of the accompanying drawings, a triple-clutch automated transmission, hereinafter referred to as transmission 10, will now be described. Transmission 10 is driven by the output of an engine 12 and generally includes a first clutch 14, a second clutch 16, a third clutch 18, an input shaft 20, a first tubular shaft 22, a geartrain having a plurality of output gearsets 24, a countershaft 26, a second tubular shaft 28, a third tubular shaft 30, an output shaft 32, and a shift control system 34.

First clutch 14 is a multi-plate clutch having a plurality of inner clutch plates 36 in splined engagement with a hub 37 fixed to first tubular shaft 22. A plurality of outer clutch plates 38 are in splined engagement with a housing 40 fixed to an input stub shaft portion 20A of input shaft 20. First clutch 14 is normally operable in an engaged or closed state to establish a drive connection between input shaft 20 and first tubular shaft 22. A first power-operated actuator 42 can be selectively actuated to apply a force to cause inner clutch plates 36 and outer clutch plates 38 to separate from one another and cease the transfer of torque through first clutch 14. In the embodiment shown, first actuator 42 is a hydraulically-actuated device that controls the magnitude of torque transferred through first clutch 14. As noted, first actuator 42 may also fully release first clutch 14 so no torque is transferred therethrough.

Second clutch 16 is a multi-plate clutch having a plurality of inner clutch plates 50 in splined engagement with second tubular shaft 28 and a plurality of outer clutch plates 52 in splined engagement with a housing 54. Housing 54 includes a central reaction ring 56 that is fixed to input shaft 20. Inner clutch plates 50 and outer clutch plates 52 are free to axially move between positions spaced apart from one another wherein second clutch 16 does not transfer torque and positions wherein inner clutch plates 50 frictionally engage outer clutch plates 52 and torque is transferred between second tubular shaft 28 and input shaft 20. Second clutch 16 is also a normally closed clutch that transmits torque when not acted upon by an external force. A second power-operated actuator 60 is operable to control actuation of second clutch 16 to selectively transfer a predetermined quantity of torque between input shaft 20 and second tubular shaft 28 or fully release the clutch plates from one another.

Third clutch 18 shares housing 54 with second clutch 16. A plurality of outer clutch plates 62 are in splined engagement with housing 54. A plurality of inner clutch plates 64 are in splined engagement with third tubular shaft 30. Outer clutch plates 62 and inner clutch plates 64 are interleaved with one another to form a clutch pack. Third clutch 18 is a normally closed clutch. A third power-operated actuator 66 is operable to control actuation of third clutch 18 to selectively disengage inner clutch plates 64 from outer clutch plates 62 and cease the transfer of torque between input shaft 20 and third tubular shaft 30. While it is contemplated that first actuator 42, second actuator 60 and third actuator 66 are hydraulically operated devices, other types of power-operated actuators including electrically-powered actuators are within the scope of the present disclosure.

The plurality of constant mesh output gearsets 24 in the geartrain include a first gearset 70 having a first drive gear 72 fixed to first tubular shaft 22 which is meshed with a first speed gear 74 rotatably supported on countershaft 26. A second gearset 76 includes a second drive gear 78 fixed to second tubular shaft 28 which is in meshed engagement with a second speed gear 80 rotatably supported on countershaft 26. A third gearset 82 includes a third drive gear 84 fixed to third tubular shaft 30 which is in meshed engagement with a third speed gear 86 rotatably supported on countershaft 26. A fourth gearset 88 includes a fourth drive gear 90 fixed to first tubular shaft 22 which is in meshed engagement with a fourth speed gear 92 rotatably supported on countershaft 26. A fifth gearset 94 includes a fifth drive gear 96 fixed to second tubular shaft 28 which is in meshed engagement with a fifth speed gear 98 rotatably supported on countershaft 26. A sixth gearset 100 includes a sixth drive gear 102 fixed to third tubular shaft 30 which is in meshed engagement with a sixth speed gear 104 rotatably supported on countershaft 26. A reverse gearset 106 includes a reverse drive gear 108 fixed to first tubular shaft 22, a reverse speed gear 110 rotatably supported on countershaft 26 and a reverse idler gear 112 which is in meshed engagement with reverse drive gear 108 and reverse speed gear 110. An output gearset 114 includes a first output gear 116 fixed to output shaft 32 and in meshed engagement with a second output gear 118 fixed to countershaft 26.

To provide a robust, compact package, first tubular shaft 22 is concentrically mounted on input shaft 20 and rotatably supported thereon by suitable bearings between input shaft 20 and a transmission case 44. Likewise, third tubular shaft 30 is concentrically mounted on input shaft 20 and rotatably supported thereon by suitable bearings between input shaft 20 and case 44. Finally, second tubular shaft 28 is concentrically mounted and rotatably supported between adjacent ends of input shaft 20 and output shaft 32 via suitable bearings.

Shift control system 34 includes a plurality of power-operated gearset clutches which are operable for selectively coupling a selected speed gear to countershaft 26 for establishing the six forward and one reverse speed ratio drive connections between input shaft 20 and output shaft 32. Preferably, these gearset clutches are electrically-actuated dog clutches. In particular, a first dog clutch 130 is operable for selectively coupling/releasing first speed gear 74 and fourth speed gear 92 to/from countershaft 26. A second dog clutch 132 is operable for selectively coupling/releasing second speed gear 80 and fifth speed gear 98 to/from countershaft 26. A third dog clutch 134 is operable for selectively coupling/releasing third speed gear 86 and sixth speed gear 104 to/from countershaft 26. A fourth dog clutch 136 is operable for selectively coupling/releasing reverse speed gear 110 to/from countershaft 26. Each dog clutch includes a sliding sleeve (denoted by the suffix "A") which is splined for rotation with and axial movement on a clutch hub (denoted by the suffix "B") which, in turn, is fixed to countershaft 26. As is conventional, bidirectional axial movement of the sliding sleeves from neutral, central uncoupled positions shown results in clutched engagement with the adjacent speed gear. Each dog clutch may be electrically powered to control axial movement of the shift sleeves. It is to be understood that any other type of power-operated device capable of moving each sliding sleeve between its uncoupled and coupled positions is within the scope of this disclosure. FIG. 3 depicts transmission 10 equipped with synchronized electrically-actuated dog clutches. The synchronizers are identified with like numerals having a suffix "prime" designation.

As best shown in FIG. 2, shift control system 34 includes a controller 150 which receives various sensor input signals, denoted diagrammatically by block 152. Transmission controller 150 is an electronically-controlled unit capable of receiving data from the vehicle sensors and generating output signals in response to the sensor input signals. The input signals delivered to controller 150 can include, without limitation, engine speed, throttle position, brake status, input shaft speed, tubular shaft speeds, countershaft speed, and output shaft speed. Controller 150 is operable to coordinate and monitor actuation of all the electrically-controlled devices associated with shift control system 34, so as to permit powershifted sequential and skip-shift gear changes automatically without any input from the vehicle operator. As such, transmission 10 is capable of being smoothly shifted automatically without power interruption.

If desired, a manually-operable mode selector switch 154 can be provided to shift transmission 10 from its automatic shift mode to a manual shift mode. Mode switch 154 would, when actuated, allow the vehicle operator to manually shift available gearshift devices (paddles, switches, etc.) to effect sequential gear shifts and skip-shifts without the use of a clutch pedal. However, controller 150 would only permit the selective gear shift to be completed if the current vehicle characteristics (i.e., engine speed, vehicle speed, etc.) permit completion of the requested shift.

To operate the vehicle, engine 12 is started with the gearshift lever in its PARK position. Each of first clutch 14, second clutch 16 and third clutch 18 are in the normally engaged state with their respective drive connections completed. However, each of the electrically-actuated dog clutches are released with each shift sleeve located in its neutral uncoupled position such that no drive torque is delivered from input shaft 20 to countershaft 26. When the vehicle operator moves the gearshift lever from the PARK position to the DRIVE position, first actuator 42 is operated to place first clutch 14 in its open state. Dog clutch 130 is then actuated to drivingly interconnect first speed gear 74 and countershaft 26. Once first speed gear 74 is drivingly coupled to countershaft 26, first actuator 42 is controlled to allow normally closed first clutch 14 to transfer torque from input shaft 20 to first tubular shaft 22. First clutch 14 is gradually engaged to smoothly accelerate the vehicle.

Thereafter, controller 150 evaluates vehicle operating parameters in an attempt to estimate the next most likely gear ratio to be provided. If controller 150 indicates that a shift into the second forward gear ratio is probable, controller 150 actuates second actuator 60 to place second clutch 16 in its open condition. At this time, second dog clutch 132 is actuated to drivingly engage second speed gear 80 with countershaft 26. If controller 150 determines that a skip shift into the third forward gear ratio may be more desirable, third actuator 66 operates to place third clutch 18 in its open condition. At this time, third dog clutch 134 is actuated to drivingly couple third speed gear 86 to countershaft 26. One skilled in the art will appreciate that because controller 150 has pre-selected the second forward gear ratio and the third forward gear ratio as possible targets, a mechanically efficient, smooth and expeditiously executed shift may be completed into either of these gears.

In particular, if a 1-2 shift is to occur, first clutch 14 is gradually disengaged while second clutch 16 is gradually engaged. Power is continuously transferred to output shaft 32 during the 1-2 shift. Alternately, if a 1-3 skip shift is to occur, first clutch 14 is gradually placed in the open condition while third clutch 18 is gradually controlled to transfer torque. The 1-3 shift previously described is also a power shift where torque is transferred to output shaft 32 at all times during execution of the shift.

The gear and clutch arrangement of transmission 10 allows controller 150 to preselect anticipated forward gear ratios to prepare for additional clutch to clutch power shifts. For example, if transmission 10 is presently operating in the fourth forward gear ratio, torque is being transferred through fourth speed gear 92. First clutch 14 is in its closed, torque transferring condition while second clutch 16 and third clutch 18 may be in their open or closed states. To pre-select the probable gear ratios, second clutch 16 and third clutch 18 are released. Second dog clutch 132 is actuated to drivingly couple fifth speed gear 98 to countershaft 26. At the same time, third dog clutch 134 is actuated to drivingly couple third speed gear 86 to countershaft 26. Transmission 10 is now prepared for a down-shift from the fourth forward gear ratio to the third forward gear ratio, or an up-shift from the fourth forward gear ratio to the fifth forward gear ratio. Either of these shifts may be completed by a simple clutch-to-clutch shift similar to the ones previously described. Specifically, a 4-3 down-shift occurs by gradually disengaging first clutch 14 while gradually engaging third clutch 18. A 4-5 up-shift may alternately be completed by gradually disengaging first clutch 14 while gradually engaging second clutch 16.

It should be appreciated that a wide variety of sequential or skip shifts may be completed as simple clutch to clutch shifts based on the grouping of various drive gears associated with each clutch. For example, the Figures depict first clutch 14 operably providing drive torque to reverse gearset 106, first gearset 70, and fourth gearset 88. Second clutch 16 is operable to allow torque transfer through second gearset 76 and fifth gearset 94. Finally, third clutch 18 selectively transfers torque through third gearset 82 and sixth gearset 100. To best meet the expected shifting scenarios, the pairings may be modified.

Transmission 10 is also operable in an energy conservation mode when operating within any one of the speed ratios. If controller 150 determines that transmission 10 has been operated in a certain drive gear for a predetermined amount of time and that the throttle position has changed only minimally, each of the dog clutches associated with the speed gears not currently transferring torque are moved to their normally centered position where a speed gear is not coupled to countershaft 26. Furthermore, the two plate clutches that are not transferring torque are allowed to return to their normally closed positions. At this time, energy is not required to be provided to any of first actuator 42, second actuator 60 or third actuator 66. When transmission 10 is in the energy conservation mode as previously described, the transmission operates very similarly to a manual transmission as opposed to a typical automatic transmission. Typical automatic transmissions require energy to be continuously supplied to cause the interleaved plates of the clutch packs to be forced into contact with one another and transfer torque. The normally closed clutches of transmission 10 alleviate the need for a supply of hydraulic pressure or electrical energy to transfer torque at a predetermined gear ratio.

From the following description, it should be apparent that transmission 10 provides an energy efficient assembly where sequential shifts are skip shifts may be pre-selected thereby requiring only clutch switching to effect a shift. Benefits include smoother, quicker sequential shifts as well as skip shifts. Depending on the number of forward and reverse gear ratios desired, various combinations of clutches and gearsets may be configured even though not explicitly depicted in the drawings. These and other variations disclose and describe merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A triple-clutch transmission for use in a motor vehicle having an engine and a driveline, comprising:
    an input shaft continuously driven by the engine;
    an output shaft adapted for connection to the driveline and having a first output gear fixed thereto;
    a countershaft having a second output gear fixed thereto in meshed engagement with the first output gear;
    a first clutch operable for establishing a releasable drive connection between the engine and a first substantially tubular shaft having a first drive gear fixed thereto, the first tubular shaft concentrically encompassing a portion of the input shaft;
    a second clutch operable for establishing a releasable drive connection between the input shaft and a second substantially tubular shaft, the second tubular shaft concentrically encompassing a portion of the output shaft and having a second drive gear fixed thereto;
    a third clutch operable for establishing a releasable drive connection between the input shaft and a third substantially tubular shaft, the third tubular shaft concentrically encompassing a portion of the input shaft and having a third drive gear fixed thereto;
    first, second and third speed gears rotatably supported on the countershaft, the first speed gear being in meshed engagement with the first drive gear, the second speed gear being in meshed engagement with the second drive gear and the third speed gear being in meshed engagement with the third drive gear; and first, second and third speed gear clutches, the first speed gear clutch operable for releasably drivingly coupling the first speed gear and the countershaft, the second speed gear clutch operable for releasably drivingly coupling the second speed gear and the countershaft, the third speed gear clutch operable for releasably drivingly coupling the third speed gear and the countershaft.

2. The triple-clutch transmission of claim 1 further including a controller for controlling actuation of the first, second and third clutches.

3. The triple-clutch transmission of claim 2 further including first, second and third actuators controlling the first, second and third clutches, respectively, the controller controlling actuation of the first, second and third actuators.

4. The triple-clutch transmission of claim 2 wherein the first, second and third speed gear clutches are power-operated dog clutches, and wherein the controller is operable to control actuation of the first, second and third speed gear clutches.

5. The triple-clutch transmission of claim 1 wherein the second and third clutches each include clutch plates in engagement with a common drum that is fixed for rotation with the input shaft.

6. The triple-clutch transmission of claim 5 wherein the second clutch includes a clutch pack disposed between the drum and the second tubular shaft.

7. The triple-clutch transmission of claim 6 wherein the third clutch includes a clutch pack disposed between the drum and the third tubular shaft.

8. The triple-clutch transmission of claim 1 further including fourth, fifth and sixth speed gears rotatably supported on the countershaft, a fourth drive gear fixed to the first tubular shaft and meshed with the fourth speed gear, a fifth drive gear fixed to the second tubular shaft and meshed with the fifth speed gear, and a sixth drive gear fixed to the third tubular shaft and meshed with the sixth speed gear.

9. The triple-clutch transmission of claim 8 wherein the first speed gear clutch is operable for releaseably drivingly coupling the fourth speed gear to the countershaft, the second speed gear clutch is operable for releaseably drivingly coupling the fifth speed gear to the countershaft, and the third speed gear clutch is operable for releaseably drivingly coupling the sixth speed gear to the countershaft.

10. The triple-clutch transmission of claim 1 wherein the second and third clutches are axially positioned between drive gears fixed to the second tubular shaft and the third tubular shaft.

11. The triple-clutch transmission of claim 1 wherein the first, second and third clutches are normally closed clutches operable to transmit torque without an application of external force.

12. A triple-clutch transmission for use in a motor vehicle having an engine and a driveline, comprising:
an input shaft continuously driven by the engine;
an output shaft adapted for connection to the driveline;
a countershaft in constant driving engagement with the output shaft;

a first clutch operable for establishing a releasable drive connection between the input shaft and a first shaft which concentrically encompasses of the input shaft;
a second clutch operable for establishing a releasable drive connection between the input shaft and a second shaft;
a third clutch operable for establishing a releasable drive connection between the input shaft and a third shaft;
a first constant mesh gearset driven by the first shaft;
a second constant mesh gearset being driven by the second driven shaft;
a third constant mesh gearset driven by the third shaft; and
first, second and third gearset clutches, the first gearset clutch operable for releasably drivingly coupling the first gearset and the countershaft, the second gearset clutch operable for releasably drivingly coupling the second gearset and the countershaft, and the third gearset clutch operable for releasably drivingly coupling the third gearset and the countershaft.

13. The triple-clutch transmission of claim 12 further including a fourth gearset driven by the first shaft, a fifth gearset driven by the second shaft, and a sixth gearset driven by the third shaft.

14. The triple-clutch transmission of claim 13 wherein the first gearset clutch is operable to releasably drivingly couple the fourth gearset and the countershaft, the second gearset clutch is operable to releasably drivingly couple the fifth gearset and the countershaft, and the third gearset clutch is operable to releasably drivingly couple the sixth gearset and the countershaft.

15. The triple-clutch transmission of claim 14 further including a reverse gearset driven by the first shaft and a fourth gearset clutch operable for releasably drivingly coupling the reverse gearset and the countershaft.

16. The triple-clutch transmission of claim 12 wherein the second shaft concentrically encompasses a portion of the output shaft.

17. The triple-clutch transmission of claim 12 wherein the third shaft concentrically encompasses a portion of the input shaft.

18. The triple-clutch transmission of claim 12 further including a controller for controlling actuation of the first, second and third clutches.

19. The triple-clutch transmission of claim 18 further including first, second and third actuators controlling the first, second and third clutches, respectively, the controller controlling actuation of the first, second and third actuators.

20. The triple-clutch transmission of claim 19 wherein the first, second and third gearset clutches are power-operated dog clutches and the controller is operable for controlling actuation thereof.

21. The triple-clutch transmission of claim 20 wherein each of the first, second and third clutches include multi-plate clutch packs.

22. The triple-clutch transmission of claim 12 wherein the first, second and third clutches are normally closed clutches operable to transmit torque without an application of external force.

* * * * *